United States Patent [19]
Barringer et al.

[11] Patent Number: 5,767,957
[45] Date of Patent: Jun. 16, 1998

[54] TESTING AN OPTICAL CABLE HAVING MULTIPLE FIBERS BY THE APPLICATION OF A LIGHT PULSE TO ALL FIBERS THROUGH OPTICAL JUMPERS OF INCREMENTALLY VARYING LENGTHS

[75] Inventors: Wayne A. Barringer, Boca Raton, Fla.; Casimer M. DeCusatis, Poughkeepsie, N.Y.

[73] Assignee: International Business Machines Corporation, Armonk, N.Y.

[21] Appl. No.: 772,055

[22] Filed: Dec. 4, 1996

[51] Int. Cl.⁶ .................................................. G01N 21/84
[52] U.S. Cl. ................................................... 356/73.1
[58] Field of Search ..................................... 356/73.1

[56] References Cited

U.S. PATENT DOCUMENTS

| | | | |
|---|---|---|---|
| 4,309,105 | 1/1982 | Lebduska | 356/73.1 |
| 5,093,568 | 3/1992 | Maycock | 356/73.1 X |
| 5,179,420 | 1/1993 | So et al. | 356/73.1 |
| 5,452,071 | 9/1995 | Takeuchi | 356/73.1 |
| 5,530,546 | 6/1996 | Barringer et al. | 356/73.1 |

Primary Examiner—Vincent P. McGraw
Attorney, Agent, or Firm—Richard A. Tomlin; Ronald V. Davidge

[57] ABSTRACT

A device for testing multi-fiber optical cables includes a number of test stations into which an end of a cable under test is plugged. Some to the test stations provide for the attachment of an array connector, while others provide for the attachment of a number of discrete connectors. The optical input/output port of an OTDR unit is connected to each of the test stations through an optical switch, which connects this port with only one such station at a time. Within each station, signals from the optical switch are divided among a number of light paths by a splitter, which also returns signals from these light paths to the OTDR through the optical switch. The various light paths within each station include fiber optic jumpers which vary in length, so that a single test pulse from the OTDR is reflected back from a number of interfaces in the cable under test as a train of pulses.

16 Claims, 3 Drawing Sheets

TESTING AN OPTICAL CABLE HAVING MULTIPLE FIBERS BY THE APPLICATION OF A LIGHT PULSE TO ALL FIBERS THROUGH OPTICAL JUMPERS OF INCREMENTALLY VARYING LENGTHS

BACKGROUND OF THE INVENTION

1. Field of the Invention

This invention relates to apparatus for testing fiber-optic cables, and, more particularly, to apparatus for facilitating the testing of such cables including a number of individual fibers.

2. Background Information

A multi-fiber optical cable consists of a number of individual glass fibers extending in a bundle from one end to another. Each of these fibers can be used to transmit a communication signal, or a number of multiplexed signals in an independent manner. At each end, the bundle of fibers is terminated in either an array connector or in a number of discrete connectors. For example, if there are twelve optical fibers in the cable, they may be terminated in an array having a single row of 12 fiber terminations, or they may be terminated in twelve discrete connectors. In fact, a cable of this sort may have an array connector at one end and twelve discrete connectors at the other end. While various multi-fiber cables are shown herein as having twelve optical fibers, or light paths, it is understood that this number is used only by way of example; the present invention is readily applied to test cables with various numbers of fibers.

In a multi-fiber optical cable, the testing of each signal path (along each single fiber) requires both insertion loss and return loss measurements on the connector at each end. These measurements require two distinct tests, with unique setups to be repeated for both connector ends. Conventional return loss measurements for jumpers manufactured with most common bulk optical fiber cable materials generally require the application and subsequent removal of an index-matching gel on the connector endfaces, in operations which are both difficult and time consuming. When the testing of such multi-fiber cables is compared to testing single-fiber cables, it is determined that these problems are compounded, since individual tests must be applied for each signal path.

Conventional insertion and return loss measurement techniques take about three or four minutes per jumper, and are prone to error. What is needed is a method to speed up such measurements, to reduce errors and reliance on skilled operators through automation, and to facilitate changes between physical contact types and connector styles. In the application of testing multi-fiber optical cables, what is particularly needed is a method for directing a signal generated by a testing device along each fiber within a cable, and for discriminating among the various signals returned along the individual signal paths.

DESCRIPTION OF THE PRIOR ART

U.S. Pat. No. 5,530,546 to Barringer, et al., describes a station for testing fiber optic jumper cables including four indexing plugboard stations. A single cable to be tested is typically attached to extend between two of the plugboard stations. Each plugboard station includes three columns of plug positions, corresponding to three styles of connecters which may be used at the ends of the cable to be tested. An upper row, and a central row, of plug positions correspond to the contact types (PC or APC) which may be used. An indexing mechanism is provided to align one of the plug positions in the central row with a reference cable extending from the plugboard station. Reference jumpers extend from the upper row, being docked in a lower row of plug positions if the cable to be tested is connected to the central row, or being plugged into the central row if the cable to be tested is connected to the upper row. The reference cable extending from each of the plugboard stations is brought into and out of contact with one of the central-row plugboard positions, facilitating a sequence of tests. The reference cables from two of these plugboard stations are connected through an optical switch to an optical time domain reflectometer (OTDR), while the other two reference cables are simply connected to connectors at their far ends. A computer controls indexing the plugboard stations and brings the reference cables into engagement according to a preferred sequence. However, this patent to Barringer, et al., addresses only the testing of single-fiber optical cables; the particular problems associated with multi-fiber cables are not addressed.

U.S. Pat. No. 4,309,105 to Lebduska describes apparatus for testing a fiber optic cable by comparing its optical transmission level with that of a known acceptance cable. Stability of the test process is achieved by using a variable, calibrated power source. The accuracy of the method is achieved by simultaneously coupling light from a common optical source into both a cable forming part of the apparatus and the fiber optic cable being tested. This arrangement keeps amplitude drift of the optical source and the apparatus detector from affecting the validity of subsequent relative measurements of the optical outputs. While Lebduska addresses the problems of speeding the test process when a large number of cables having the same contact type and connector style are to be tested, with types of tests being described together with means for assuring their accuracy, the problem of testing a multi-fiber optical cable is not addressed.

U.S. Pat. No. 5,179,420 to So et al. describes an optical time domain reflectometer (OTDR), in which an optical signal is coupled to an optical fiber path to be tested, and in which back-scattered and reflected light from the optical fiber path is detected and used to determine loss-distance characteristics of the path. A control unit varies the wavelength of the optical signal by varying the temperature of the semiconductor laser constituting the optical source, so that the loss-distance characteristics for a plurality of different wavelengths are determined and can be displayed to show any wavelength-dependent loss of the optical fiber path. Such a loss may be due to modal interference associated with closely-spaced discontinuities in the path. Thus, while So et al. discuss particular improvements to an OTDR, along with the methods of its use, the problem of testing a multi-fiber optical cable is not addressed.

U.S. Pat. No. 5,093,568 to Maycock describes a monitoring system which continuously monitors fiber optic cables for faults, and which then enables automatic location of a fault in the cable. In the system, an optical signal is generated and connected as an output signal to a first end of the fiber optic cable for transmission to a second end. The signal is then returned through the fiber optic cable to provide a return signal at the first end of the cable. A comparator at the first end compares the output signal and the return signal and provides corresponding difference data. An OTDR detects the location of a signal loss along the fiber optic cable, and a data processing system determines the location of the signal loss from the corresponding difference data. A single optical time domain reflectometer can be used for monitoring a plurality of fiber optic cables. Maycock addresses a need to test multiple fiber optic cables by using an OTDR switch selecting among the cables to be tested. The apparatus of Maycock is typically attached permanently to a number of fiber optic cables for continuous monitoring. For testing individual multi-fiber cables, what is needed is a rapid means allowing the simultaneous testing of the various fibers within a cable.

SUMMARY OF THE INVENTION

According to a first aspect of the invention, there is provided apparatus for discriminating among reflections of a single light test pulse from a number of interface surfaces individually placed along a number of optical fibers, in a multi-fiber optical cable at locations equally distant from a near end of the multi-fiber cable, includes a number of optical fiber jumpers, each of which is optically connected to an optical fiber within the multi-fiber optical cable. The single light pulse is directed along each optical fiber jumper to an optical fiber in the multi-fiber optical cable. A reflection from an interface surface is returned along each of the optical fiber jumpers, which are of various length, so that measurably varied differences are provided in the times at which each reflection is returned along each optical fiber jumper.

DETAILED DESCRIPTION

Figure 1:
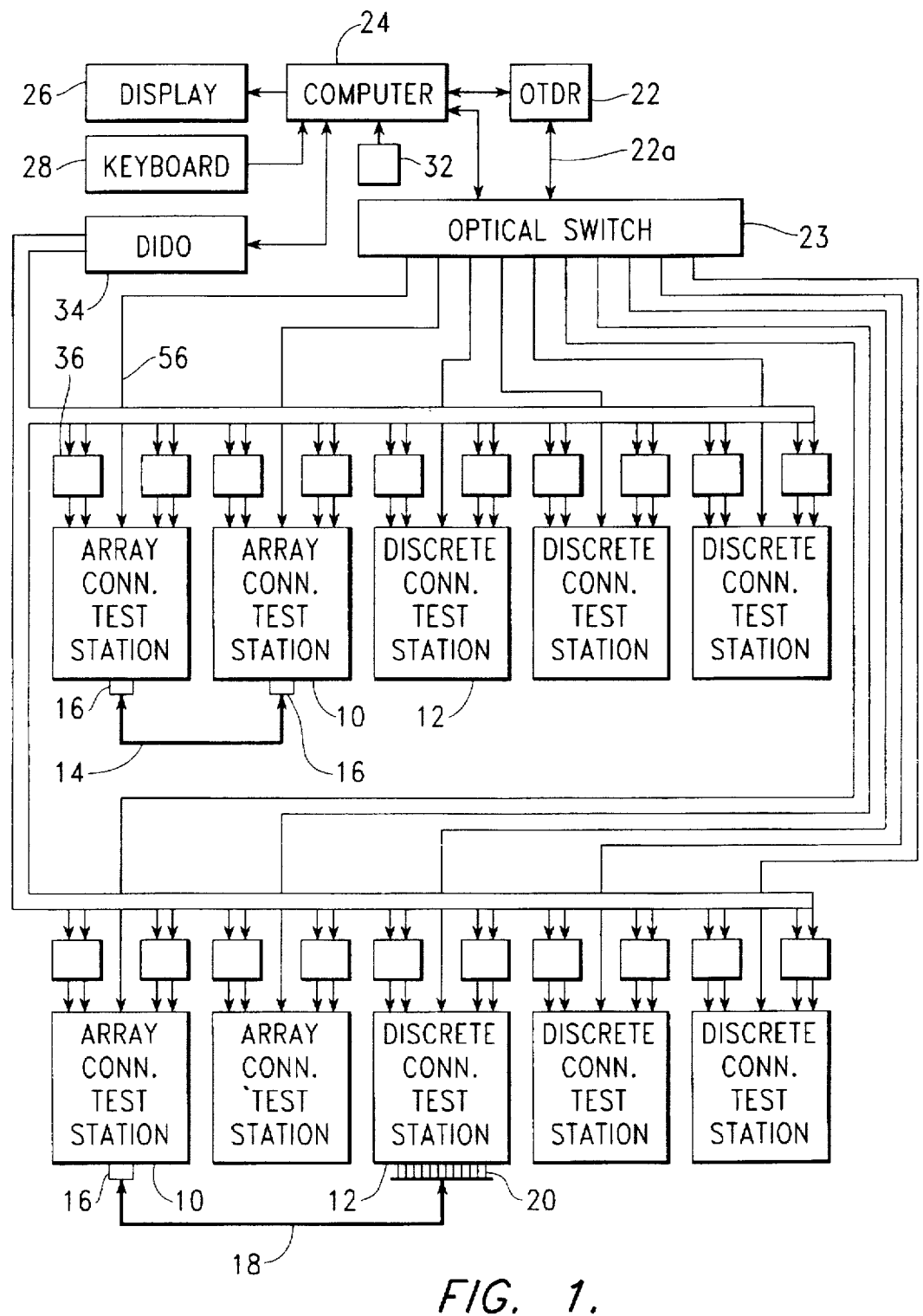
FIG. 1 is a schematic view of multi-fiber optical cable testing apparatus built in accordance with the present invention.

FIG. 1 is a schematic view of multi-fiber optical cable testing apparatus built in accordance with the present invention. This apparatus provides a number of discrete connector testing stations 10 and a number of array connector testing stations 12. Each cable to be tested is plugged into this apparatus so that it extends between two connector testing stations into which its end connectors are plugged, with the type(s) of connector testing station(s) depending on the type(s) of connectors at the two ends of the cable. In the example of FIG. 1, the apparatus is configured to test a first cable 14 having array connectors 16 at each end, and a second cable 18 having an array connector 16 at one end and discrete connectors 20 at the other end. Each cable 14, 16 may be a single-mode or multi-mode type.

The apparatus includes a single OTDR unit 22 (Optical Time Domain Reflectometer) which generates the light pulses used in the testing process, and which receives and evaluates the signals reflected back from the cables and connectors being tested. Both the test pulse and its reflections travel along a single optical fiber 22a constituting an optical input/output port of the OTDR unit 22. During process performing a single test operation, the OTDR unit 22 emits a single pulse, which is provided as an input to optical switch 23. This switch has ten outputs, which are in turn provided as inputs to each testing station 10, 12. The optical switch 23 directs each pulse from OTDR unit 22 to only one of the testing stations 12 to which cable under test, such as cable 14 or 18, is attached.

Within the test station 10 or 12 to which this pulse is directed, the energy of this pulse is equally divided among light paths extending toward each of the individual fibers within the cable under test. Within each of these light paths, this pulse is reflected off an interface surface which is determined by the manner in which connections are made between the test station 10, 12 and the cable under test. The reflection of each such pulse forms a return signal, which is transmitted through the optical switch 23 into the OTDR unit 22. Within a typical multi-fiber optical cable under test, each fiber is of the same length, so that a single pulse directed through all the fibers and reflected from each connector interface is returned as a simultaneous number of pulses which cannot be discriminated, one from another, if they are combined. Therefore, within each test station 10 or 12, each jumper forming a part of each light path to an individual cable fiber is a different length, so that the times at which these return signals reach the OTDR unit 22 are spread apart, allowing discrimination among the various return signals. Within the OTDR unit 22, these return signals are used to calculate various parameters for the connector and light path associated with each fiber within the cable under test.

The testing process is also controlled through the use of a computing system 24, which displays results on a display unit 26, and which responds to operator input provided through a keyboard 28. A program for performing the operations required of computing system 24 executes within the computing system, having been provided as an input through one or more floppy disks 32. The computing system 24 is connected to OTDR unit 22 and to a DIDO unit 34 (Digital In, Digital Out) through a cable 36, extending from the output port of an adapter card (not shown) within the computing system 24. This interface can be achieved, for example, using an adapter card and software available from OPTO 22 of Temecula, Calif., under the name PAMUX.

The performance of tests within the apparatus of FIG. 1 requires the sequential engagement and disengagement of various cable connectors attaching the cables under test, such as cables 14, 18 to the test stations 10, 12. The motions required to engage and disengage these connectors are automatically performed through pneumatic sliders within the test stations 10, 12. Each of these pneumatic sliders, which will be discussed in reference to FIGS. 2 and 3, is operated by a solenoid valve 36, which is electrically connected to an output of DIDO unit 34.

Figure 2:
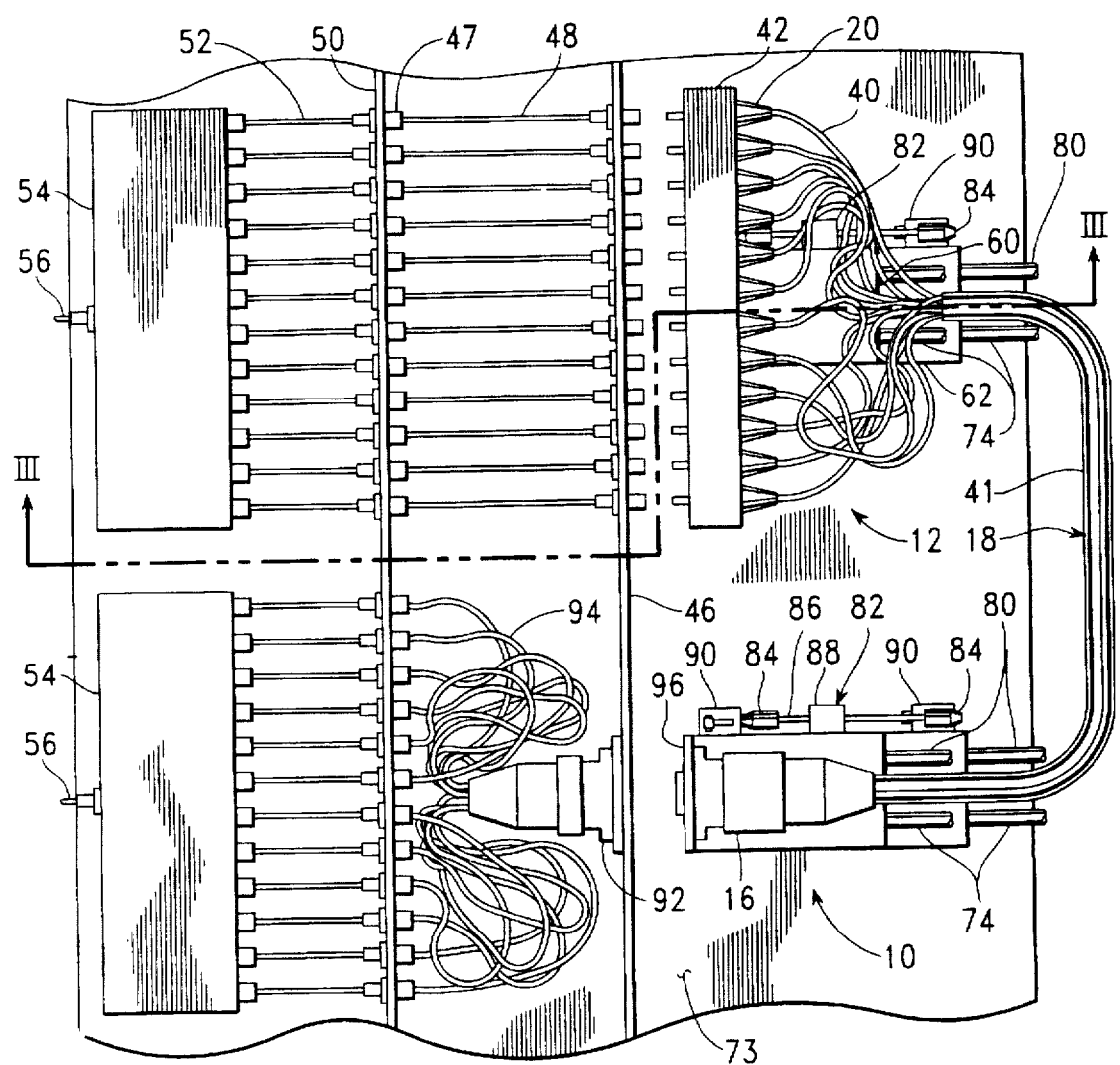
FIG. 2 is a fragmentary plan view of the testing apparatus of FIG. 1, showing a discrete connector testing station and an adjacent array connector testing station.

FIG. 2 is a fragmentary plan view of the test apparatus built in accordance with the present invention, showing particularly an array connector test station 10 and a discrete connector test station 12 therein. FIG. 3 is a vertical cross-sectional view taken as indicated by section lines III—III in FIG. 2 through the discrete connector test station 12.

Figure 3:
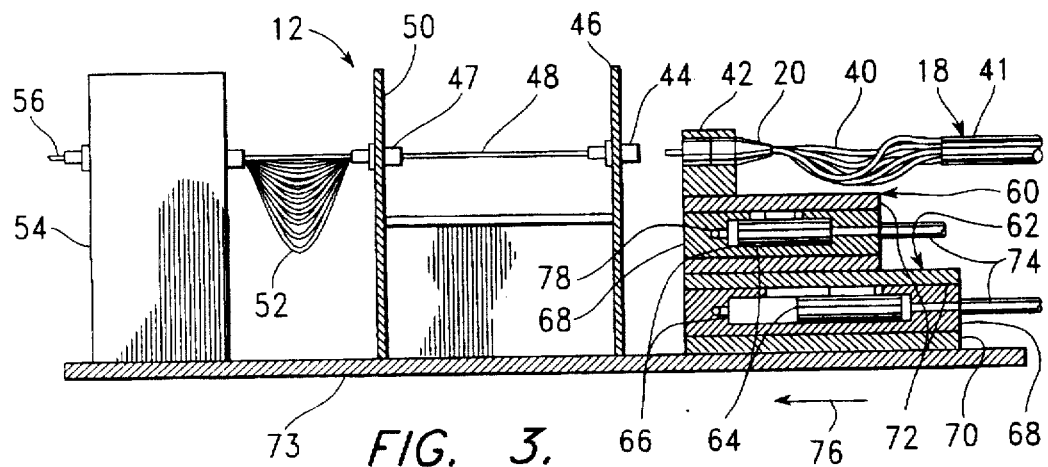
FIG. 3 is a vertical cross-sectional view of the discrete connector testing station of FIG. 2, taken as indicated by section lines III—III in FIG. 2.

The configuration and use of the discrete connector test station 12 will now be considered, with particular references being made to the elements identified in FIGS. 2 and 3. This test station 12 is configured for attachment to a cable having a number of discrete connectors 20 at the ends of "pigtail" portions 40, which extend from the main body 41 of the cable 18. Each pigtail portion 40 includes a single optical fiber, forming one of the independent light paths through the cable 18. For testing the particular cable 18, discrete connectors 20 are attached within a mounting bar 42 in alignment with a number of mating front face connectors 44, which extend in an array along front face plate 46. In the example of FIGS. 2 and 3, this array comprises a single row of twelve connectors 44. Each connector 44 is connected to an intermediate connector 47 through a single optical fiber jumper 48. The intermediate connectors 47 extend along an intermediate plate 50. A rear optical fiber jumper 52 extends in turn between each intermediate connector 47 and a splitter 54.

Referring to FIGS. 1-3, the splitter 54, receiving input pulses along a single input line 56 from optical switch 23, divides the power of these pulses equally and accurately among the twelve rear jumpers 52. While a single test is begun with a single pulse from the OTDR unit 22, twelve return pulses are generated, one from each of the twelve light paths into the cable 18 under test. During the testing process, the OTDR unit 22 measures the level of the return pulse for each light path, providing data which is used for subsequent calculations to determine values of parameters associated with the cable under test. To calculate the parameters for each light path, several measurements, made sequentially, are compared. These evaluations can only be made with a capability for discriminating among the pulses returned from individual light paths. To provide this capability, the lengths of rear jumper cables 52 are incrementally varied. Since each pulse from the OTDR unit 22 must travel, to the surface from which it is reflected, along the rear jumper cable 52, and since the reflected pulse must subsequently travel back to the OTDR unit 22 along the same rear jumper cable 52, at the speed of light within the jumper cables, incrementally varying the length of these cables 52 within a single discrete connector test station 12, causes a pre-determined variation in the times at which such pulses return along the twelve light paths.

Referring additionally to FIG. 1, all testing is thus accomplished through the use of pulses from the OTDR unit 22. A first level of distribution, among the various test stations 10, 12, and hence among the cables under test attached thereto, is made through the operation of optical switch 23, which connects the output of OTDR unit 22 to a single test station 10, 12. At the next level, a pulse from the OTDR unit 22 is simultaneously introduced to all of the light paths leading toward the individual fibers of a single cable under test. However, the system is able to discriminate among the reflections back into the OTDR unit 22 by means of timing differences introduced by variations among the lengths of jumper cables 52 within each test station 10, 12. This method for discriminating among the results obtained for the light paths of a single cable has a particular advantage of allowing the testing of all such light paths in a single operation.

Referring particularly to FIG. 3, the discrete connectors 20 are engaged with corresponding front face connectors 44, and are disengaged therefrom, by means of a pair of pneumatic sliders 60, 62. The lower slider 62 has a relatively long travel, of about 25 millimeters, so that it can be used to separate the clamping block 42 from the front face connectors 44 through a distance suitable for cleaning the ends of the connectors 44. The upper slider 60 has a relatively short travel, of about 1 millimeter, so that it can be used to engage and disengage the connectors 20, 44 rapidly during the testing process. These pneumatic sliders 60, 62 have a number of features formed using similar parts, which are identified herein using common reference numerals. Sliders of this type may be purchased from THK Co., Ltd, Tokyo, Japan, under the name "Ball Slide Equipped with Pneumatic Cylinder Type LSC."

Each pneumatic slider 60, 62 includes a number of similar elements, which are identified herein using common reference numerals, such as a piston 64 moving in a cylinder chamber 66 within a block 68. Each block 68 is attached to a base channel 70, and each piston 64 is attached to a sliding channel 72. The base channel 70 of lower slider 62 is attached to a baseplate 73 of the test apparatus. The base channel 70 of upper slider 60 is attached to the sliding channel 72 of lower slider 62. Air under pressure is supplied to a first end of each cylinder chamber 66 by a first hose 74, causing the piston to move in the direction of arrow 76. Air under pressure is supplied to the opposite end of each cylinder chamber 66 through a duct 78, which is connected to a second hose 80 (shown in FIG. 2). Air is directed to these hoses 74, 80 through the solenoid valves 36 (shown in FIG. 1), which are preferably arranged so that each hose 74, 80 is exhausted to the atmosphere when air is supplied under pressure to the other hose. Thus, the movement of clamping block 42, which is attached to the sliding channel 72 of upper slider 60, and hence of the discrete connectors 20, is defined by the sum of the movements of both sliding channels 72.

Referring to FIG. 2, either or both of the pneumatic sliders 60, 62 may additionally be provided with an electrical switching assembly 82, which includes a pair of actuators 84 adjustably mounted on a shaft 86, which is in turn fastened to a tab 88 extending outward from the sliding channel 72. Each of these actuators 84 operates a switch 90 as the sliding channel nears an end of its motion, providing an electrical indication of the position of the channel 72.

The individual connectors 20, 44 are provided with alignment and engagement features, operable through small distances to assure that the optical fibers within opposing mated connectors are in alignment with one another and that an appropriate contact force is maintained between these optical fibers. While these features will not compensate for relatively large misalignments between mating connectors, their capabilities are sufficient to allow multiple connectors to be mounted on rigid structures on each side.

Continuing to refer to FIG. 2, in each array connector test station 10, the front face connectors 44 and individual optical fiber jumpers 48 of the discrete connector test station 12 are replaced by a front face array connector 92, which is configured to provide a mating connection for the cable array connector 16. A number of discrete fiber-optic lines 94 extend from the front face array connector 92 to make individual connections through intermediate connectors 47 and rear fiber optic jumpers 52 to the outputs of a splitter 54. Each fiber-optic line 94 includes a single optical fiber, forming one of the independent light paths through the front face array connector 92, and into the cable under test 18 when the array connectors 16, 92 are engaged.

The cable array connector 16 is attached by means of a mounting bracket 96 to a sliding channel 72 of an upper slider 60, which is in turn mounted atop a lower slider 62, so that the cable array connector 16 is moved in and opposite the direction of arrow 76 in the manner previously described relative to the discrete connectors 20 of the discrete connector test station 12.

Referring to FIGS. 2 and 3, in order to discriminate among the optical signals reflected within the various optical paths during the test procedures, the rear jumpers 52 of each test station 10, 12 are incrementally varied in length. Thus, after a single pulse is emitted by the OTDR unit 22 (shown in FIG. 1), the reflections of the pulse return to the OTDR unit at times incrementally varied by the difference in the time traveled by the pulse in both directions along the various jumpers 52.

Figure 4:
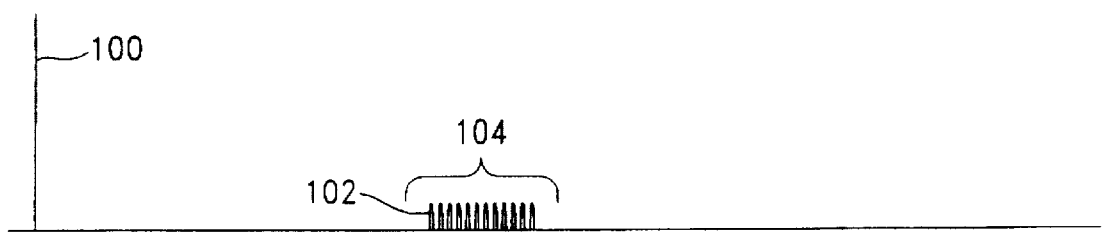
FIG. 4 is a graphical view of signals at an OTDR unit in the apparatus of FIG. 1 during a calibration process.
Figure 5:
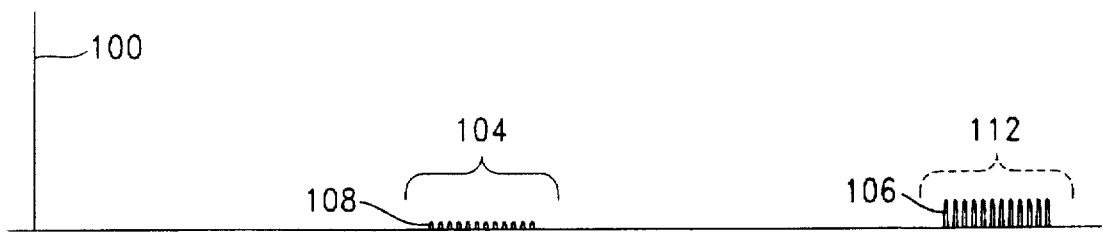
FIG. 5 is a graphical view of signals at the OTDR unit in the apparatus of FIG. 1 during testing of a multi-fiber optical cable.

FIGS. 4 and 5 are a graphical views of the transmission of a test pulse of light, as transmitted from the OTDR unit 22, and the reflections of this pulse as returned to the OTDR unit during the multi-fiber cable testing process.

The process of testing the multi-fiber cable 18 will now be described in reference to FIGS. 1, 2, 4, and 5. In this process, testing occurs at a near end connector of the cable and at a far end connector thereof. In this example, the near end connector is assumed to be array connector 16, while the far end connector is assumed to be discrete connectors 20. This assignment is arbitrary; multi-fiber cables having array connectors at each end, or discrete connectors at each end, are tested in the same way.

The first series of tests occurs with the optical switch 23 connecting the OTDR unit 22 to the array connector test station 10 to which the cable under test 18 is attached, so that measurements are made at the near end connection of the cable. During this series of tests, the far end connectors 20 are disengaged, with the sliding channel 72 of upper slider 60 of the far end test station 12 being moved opposite the direction of arrow 76. For the first test, which is graphically represented by FIG. 4, the near end connector 16 is also disengaged, with the sliding channel 72 of upper slider 60 of the near end test station 10 also being moved opposite the direction of arrow 76, so that the light pulse 100 emitted by the OTDR unit 22 is reflected and returned to the OTDR unit as a first series of twelve pulses 102, with each pulse 102 being a reflection of an end of an optical fiber within the near end front face connector 92. These pulses 102 are spaced apart by a time determined by the difference in length of adjacent intermediate optical fiber jumpers 52 within the array connector test station 10. While this test is really a calibration of the test apparatus without the cable 18, it is preferably repeated each time a new cable 18 is tested, so that changes due to wear and dust collection on the end surfaces of the optical fibers in front face connector 92 are automatically tracked.

The OTDR unit 22 has a capability of receiving and analyzing pulses from a limited but adjustable time period, represented in FIGS. 4 and 5 by a bracket 104, following the emission of the test pulse 100. During this portion of the testing process, this time period is adjusted to include all twelve pulses 102.

Continuing to refer to FIGS. 1, 2, and 5, FIG. 5 is a graphical view of the reflections occurring following the emission of a single pulse 100 by the OTDR unit 22 (shown in FIG. 1) during the second and third tests, which also are performed with the optical switch 23 connecting the output of OTDR unit 22 with the test station 10 to which the near end of the cable under test 18 is connected. These tests are both performed with the near end cable connector 16 engaged with the mating front face connector 92, but with the far end cable connectors 20 disengaged from the mating front plate connectors 47. In each of these tests, the far end connectors 20 produce relatively strong reflection pulses 106, since these connectors are not connected to other optical fibers, while the near end front face connector 92 produces relatively weak reflection pulses 108, since it is connected by mechanical pressure to the fibers within the near end cable connector 96. Connection in this way causes a predominant portion of the energy within a light pulse to be transmitted, instead of reflected. The delay between the first group of pulses 108 and the second group of pulses 106 is derived from the time for the emitted pulse 100 to travel the length of the cable under test 18 and for its reflections to return through the cable 18.

For the second test, the time period during which the OTDR unit 22 can receive pulses for analysis is adjusted to the time indicated by bracket 110, so that the twelve pulses 108 reflected from the interface at the near end of the cable 18 can be received for analysis. For the third test, this time period is adjusted to the alternate time indicated by bracket 112, so that the twelve pulses 106 reflected from the interface at the far end of the cable 18 can be received for analysis.

After these three tests are completed, the optical switch 23 is operated to terminate the connection between the OTDR unit 22 and the near end test station (in this example, array connector test station 10) and to connect the OTDR unit 22 with the far end test station (in this example, discrete connector test station 12). Next, the three tests described above are repeated, with the test pulse and reflected pulses being transmitted through the far end test station 12. All of these tests are completed with the near end connection being disengaged by the movement of the upper slide 60 to which the array connector 16 is attached in the direction opposite that of arrow 76. The first of these tests is completed with the far end connection at far end test station 12 also disconnected, through the movement of the upper slider 60 to which the clamping bar 42 is attached. This test allows the calibration of the apparatus from the far end test station 12. Next, two tests are completed with the far end connection engaged by the movement of the upper slider 60 to which the clamping bar 42 is attached. These three test produced the results shown in FIGS. 4 and 5, with the time during which reflected pulses are received for analysis being adjusted as described above in reference to these FIGS.

The actual parameters describing the transmission characteristics of each light path through the cable 18 under test are calculated from the measurements described above. The individual measurements can be made in any order (with, for example, the third test being conducted before the second), but it is of critical importance that measurements using light reflected from different light paths must not be combined to calculate such parameters. The method described herein for discrimination among signals returned to the OTDR unit 22 as reflections of a single test pulse 100 is particularly advantageous in providing a reliable and repeatable method for achieving such discrimination.

The preceding discussion has described a configuration and process for testing PC (physical contact) connections, in which the ends of optical fibers at connection interfaces are polished to form planes extending perpendicularly to the axes of the optical fibers. Cables to be tested may alternately have an APC (angle physical contact) connector at one end or at both ends. In APC connectors, the optical fibers are polished to form planes extending at an oblique angle to the axes of the optical fibers. APC connectors have the advantage, when compared to PC connectors, of generally better transmission characteristics. However, APC connectors have the disadvantage of not producing uniform, or reliable results when they are unplugged and plugged in a testing operation like the one previously described. Therefore, when a multi-fiber cable having an APC connector is to be tested, the APC connector is connected to the testing apparatus using a reference jumper having a PC connector at one end, to mate with the testing apparatus, and an APC connector at the other end, to mate with the cable being tested. The test processes of disconnection and reconnection are carried out between the PC connector of the reference jumper and the test apparatus.

Figure 6:
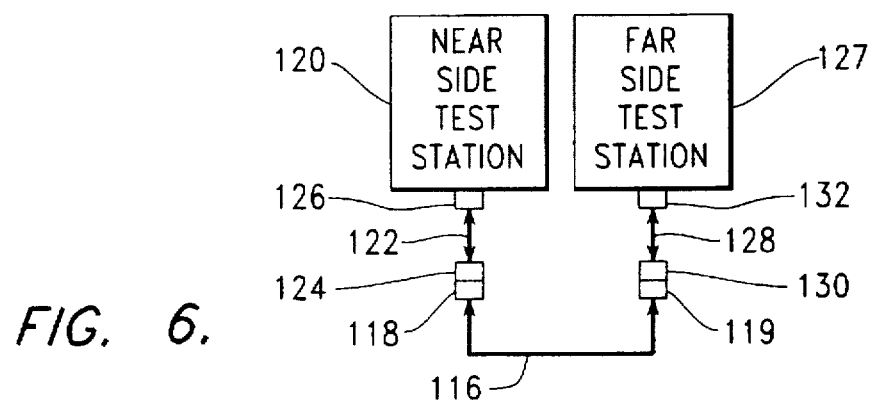
FIG. 6 is a fragmentary schematic view of the testing apparatus of FIG. 1 configured to test a multi-fiber optical cable with an APC connector at each end.

Thus, FIG. 6 is a fragmentary schematic view of the test apparatus of FIG. 1 configured to test a multi-fiber cable 116 having a near side APC array connectors 118 at one end and a far side APC connector 119 at the other end. This cable 116 is connected to a near side test station 120 by means of a near side reference jumper 122 having a APC array connector 124 at one end and a PC array connector 126 at the other end. The cable 116 under test is also connected to a far side test station 127 by means of a far side reference jumper 128 having an APC array connector 130 at one end and a PC array connector 132 at the other end. Both the test stations 120, 127 are, in this example, array connector test stations 10 from the apparatus of FIG. 1. The changes in name and reference numerals are made herein to facilitate discussing the testing process.

Referring to FIGS. 1 and 6, before each multi-fiber cable 116 is tested, calibration tests are run on the reference jumpers 122, 128. These tests are begun by measuring reflections within the near side test station 120 without the connection of an external cable. The optical switch 23 is connects the near side test station 120 to the OTDR unit 22. Next, the reference jumpers 122, 128 are connected to one another by their APC connectors 124, 130, to near side test station 120 by PC connector 126, and to far side test station 127 by PC connector 132.

For testing the multi-fiber cable 116, the cable connectors 118, 119 are connected so that the cable 116 extends, as shown in FIG. 6, between the reference jumpers 122, 128. The first series of tests is conducted with the PC connector 132 of far side reference jumper 128 disengaged from far side test station 127 and with the OTDR unit 22 connected to near side test station 120 by optical switch 23. In the first of these tests, the PC connector 126 of near side reference jumper 122 is also disengaged, so that the characteristics of near side test station 120 can be checked. In the second of these tests, the near side reference jumper 122 is engaged with near side test station 120. The OTDR unit 22 is adjusted so that, after a test pulse is emitted, the pulses reflected from the interface of far side reference jumper connectors 132 are stored and analyzed. Next, this test is repeated, with the OTDR unit 22 being adjusted so that the pulses reflected from the interface of far side reference connector jumpers 119, 130 are stored and analyzed.

The next series of tests is connected with the PC connector 126 of near side reference jumper 122 disengaged from near side test station 120, with far side connector 132 held in engagement with the far side test station 127, and with the OTDR unit 22 connected to far side test station 127 through the optical switch 23. In the first of these tests, the OTDR unit 22 is adjusted so that, after a test pulse is emitted, the pulses reflected from the interface of near side jumper connector 126 are stored and analyzed to obtain reference information. In the second of these tests, the OTDR unit 22 is adjusted so that, after a test pulse is emitted, the pulses reflected from the interface of near-side connectors 118, 124 are stored and analyzed.

Figure 7:
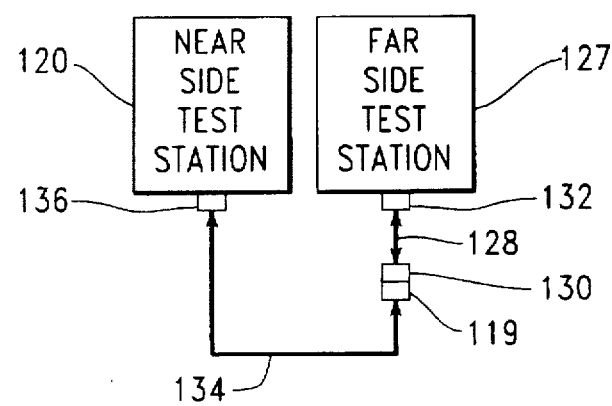
FIG. 7 is a fragmentary schematic view of the testing apparatus of FIG. 1 configured to test a multi-fiber optical cable with an APC connector at one end and a PC connector at the other end.

FIG. 7 is a fragmentary schematic view of the test apparatus of FIG. 1 configured to test a cable 134 having an APC array connector 119 at one end and a PC connector 136 at the other end. The test apparatus is configured as shown in to FIG. 6, except that only the far side reference jumper 128 is used. The other end of the cable 134 under test, having PC connector 136, is plugged directly into near side test station 120.

Referring to FIGS. 1 and 7, the first series of tests with the configuration of FIG. 7 is conducted with the far side reference jumper connector 132 disengaged from far side test station 127, and with the OTDR unit 22 connected to near side test station 120 through optical switch 23. The first of these tests, which develops reference information relative to the test apparatus, is performed with the near side cable connector 136 also disconnected from the near side test station 120, so that the reflection characteristics of the connector within the near side test station 120, to which the cable connector 136 is subsequently engaged, can be determined. The remaining two tests in this series are conducted with cable connector 136 engaged to near side test station 120. In the first of these tests, the OTDR unit 22 is adjusted to save and analyze reflections from the interface between near side cable connector 136 and near side test station 120. In the second of these tests, the OTDR unit 22 is adjusted to save and analyze reflections from the interface at disconnected far side jumper connector 132.

The next series of tests is conducted with the far side reference jumper connector engaged with far side test station 127, which is now connected to the OTDR unit 22 through switch 23, and with the near side cable connector 136 disconnected from near side test station 120. For the first of these tests, the OTDR unit 22 is adjusted to save and analyze reflections from the interface of disconnected cable connector 136. For the second of these tests, the OTDR unit 22 is adjusted to save and analyze reflections from the interface of the APC connectors 119, 130.

In each of the individual tests described above in reference to FIGS. 6 and 7, the capability, previously described in reference to FIG. 2, of discriminating among the reflections from the various light paths to the individual fiber interfaces, through the use of fiber-optic jumpers 52 of incrementally varied lengths, is used. While the cables under test are described as having array connectors, these cables, and the reference jumpers attached to them, can easily have discrete connectors at one or both ends.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for discriminating among reflections of a single light test pulse from a plurality of interface surfaces individually placed along a plurality of optical fibers in a multi-fiber optical cable at locations equally distant from a near end of said multi-fiber optical cable:

wherein said apparatus comprises a first port at which a device generating said single light test pulse is attached, a second port at which a near end of said multi-fiber optical is attached, a plurality of optical fiber jumpers, each of which extends along an optical signal path between said first port and said second port to be optically connected to an optical fiber within said plurality thereof in said multi-fiber optical cable at said second port;

wherein said single light test pulse is directed along each optical fiber jumper within said plurality thereof to an optical fiber within said plurality thereof in said multi-fiber optical cable;

wherein a reflection from an interface surface within said plurality thereof is returned along each said optical fiber jumper; and wherein said optical fiber jumpers are of various lengths, providing measurably varied differences in times at which each said reflection is returned along each said optical fiber jumper.

2. The apparatus of claim 1, wherein said optical fiber jumpers are varied in length by a common incremental distance, so that said reflections are returned as a train of pulses individually separated by a common incremental time.

3. Apparatus for determining characteristics of interface surfaces of optical fibers forming a plurality of parallel light paths within a multi-fiber optical cable, wherein said apparatus comprises:

pulse generating means for generating a test signal of light transmitted through a first optical port;

a first splitter, optically coupled to said first optical port and to a first plurality of splitter interfaces, wherein said first splitter divides optical signals from said pulse generating means among said first plurality of splitter interfaces, and wherein said splitter directs optical signals from each splitter interface within said first plurality thereof to said first optical port;

signal recording means for recording data representative of signals transmitted to said first optical port from said first splitter; and a first plurality of optical fiber jumpers, wherein each jumper within said first plurality thereof forms a portion of a light path connecting a splitter interface within said first plurality thereof with a parallel light path within said plurality thereof in said multi-fiber optical cable at a first end of said multi-fiber optical cable, and wherein said optical fiber jumpers within said first plurality thereof are individually varied in length to provide measurably varied differences in times at which reflections of said test signal return through said first optical port from interfaces of said parallel light paths within said multi-fiber optical cable.

4. The apparatus of claim 3, wherein optical fiber jumpers within said first plurality thereof are varied in length by a common incremental distance, so that said reflections of said test signal return as a train of signals individually separated by a common incremental time.

5. The apparatus of claim 3, comprising additionally:

optical switching means operable in a first state connecting said first optical port with a second optical port and in a second state connecting said first optical port with a third optical port, with said optical switching means being connected to said first splitter through said second optical port;

a second splitter, optically coupled to said third optical port and to a second plurality of splitter interfaces, wherein said second splitter divides optical signals from said pulse generating means among said second plurality of splitter interfaces, and wherein said second splitter directs optical signals from each splitter interface within said plurality thereof to said third optical port;

a second plurality of optical fiber jumpers, wherein each jumper within said second plurality thereof forms a portion of a light path connecting a splitter interface within said second plurality thereof with a parallel light path within said plurality thereof in said multi-fiber optical cable at a second end of said multi-fiber optical cable, with said second end of said multi-fiber optical cable being opposite said first end thereof and wherein said optical fiber jumpers within said second plurality thereof are individually varied in length to provide measurably varied differences in times at which reflections of said test signal return through said second optical port from interfaces of said parallel light paths within said multi-fiber optical cable.

6. The apparatus of claim 5:

wherein optical fiber jumpers within said first plurality thereof are varied in length by a common incremental distance, so that said reflections of said test signal return to said first optical port as a train of signals individually separated by a common incremental time with said switching means in said first state: and wherein optical fiber jumpers within said second plurality thereof are varied in length by said common incremental distance, so that said reflections of said test signal return to said first optical port as a train of signals individually separated by a common incremental time with said switching means in said second state.

7. The apparatus of claim 5, comprising additionally:

first connection means, operating in response to a first signal, for connecting and disconnecting an optical connection between optical fiber jumpers within said first plurality thereof and said first end of said multi-fiber optical cable; and second connection means, operating in response to a second signal, for connecting and disconnecting an optical connection between optical fibers within said second plurality thereof and said second end of said multi-fiber optical cable.

8. The apparatus of claim 7, comprising in addition a controller operating said optical switching means, said first connection means, and said second connection means according to a pre-determined sequence to perform a number of test operations.

9. The apparatus of claim 8, comprising additionally:

a first array connector connecting optical fibers within said plurality thereof in said multi-fiber optical cable, at said first end thereof, with a plurality of light paths extending through said optical fiber jumpers in said first plurality thereof; and a second array connector connecting optical fibers within said plurality thereof in said multi-fiber optical cable, at said second end thereof, with a plurality of light paths extending through said optical fiber jumpers in said second plurality thereof.

10. The apparatus of claim 8, comprising additionally:

a first array connector connecting optical fibers within said plurality thereof in said multi-fiber optical cable, at said first end thereof, with a plurality of light paths extending through said optical fiber jumpers in said first plurality thereof; and a plurality of discrete connectors connecting optical fibers within said plurality thereof in said multi-fiber optical cable, at said second end thereof, with a plurality of light paths extending through said optical fiber jumpers in said second plurality thereof.

11. The apparatus of claim 8, comprising additionally:

a first plurality of discrete connectors connecting optical fibers within said plurality thereof in said multi-fiber optical cable, at said first end thereof, with a plurality of light paths extending through said optical fiber jumpers in said first plurality thereof; and a second plurality of discrete connectors connecting optical fibers within said plurality thereof in said multi-fiber optical cable, at said second end thereof, with a plurality of light paths extending through said optical fiber jumpers in said second plurality thereof.

12. The apparatus of claim 8:

wherein said apparatus comprises additionally a reference jumper cable having at a distal end an APC connector connecting to an optical fiber within said plurality thereof in said multi-fiber optical cable, at said first end thereof, and at a proximal end an PC connector connecting to a light path extending through an optical fiber jumper within said first plurality thereof; and wherein said first connection means connects and disconnects said reference end at said proximal end thereof.

13. A method for determining characteristics of interface surfaces individually placed along a plurality of optical fibers in a multi-fiber optical cable at locations equally distant from a near end of said multi-fiber optical cable, wherein said method comprises the steps of:

a) sending a light pulse from a first port through a plurality of optical fiber jumpers, each of which is optically connected to an optical fiber within said plurality thereof in said multi-fiber optical cable at said near end thereof with said light pulse travelling from said first port to said multi-fiber optical cable along said optical fiber jumpers in said plurality thereof;

b) receiving a reflection at said first port of said light pulse from each said interface surface, wherein each said reflection travels through an optical fiber jumper in said plurality thereof from said multi-fiber optical cable to said first port, and wherein said optical fiber jumpers within said plurality thereof are of various lengths, providing measurably varied differences in times at which each said reflection is received; and c) storing a value corresponding to an intensity of each said reflection as it is received.

14. The method of claim 13, wherein said optical fiber jumpers are varied in length by a common incremental distance, so that said reflections are returned as a train of pulses individually separated by a common incremental time.

15. A method for determining characteristics of interface surfaces within first and second pluralities thereof within a plurality of parallel optical paths, wherein each interface surface within said first plurality thereof is located in an optical path in said plurality thereof at a first distance from a near end thereof, wherein each interface surface within said second plurality thereof is located in an optical path in said plurality thereof at a second distance from said near end thereof, and wherein said method comprises the steps of:

a) sending a first light pulse from a first port through a plurality of optical fiber jumpers, each of which is optically connected to a light path in said plurality thereof at said near end thereof;

b) receiving a reflection at said first port of said first light pulse from each said interface surface in said first plurality thereof, wherein each said reflection travels through an optical fiber jumper in said plurality thereof, and wherein said optical fiber jumpers are of various lengths, providing measurably varied differences in times at which each said reflection is received;

c) storing a value of each said reflection from each said interface surface in said first plurality thereof;

d) sending a second light pulse from said first port through said plurality of optical fiber jumpers;

e) receiving a reflection at said first port of said second light pulse from each said interface surface in said second plurality thereof, wherein each said reflection travels through an optical fiber jumper in said plurality thereof; and f) storing a value of each said reflection from each said interface surface in said second plurality thereof.

16. The method of claim 13, wherein said optical fiber jumpers are varied in length by a common incremental distance, so that reflections from interface surfaces in said first and second pluralities thereof are returned as trains of pulses individually separated by a common incremental time.

* * * * *